(12) United States Patent
Smith

(10) Patent No.: US 11,807,059 B1
(45) Date of Patent: Nov. 7, 2023

(54) SHOCK END LOOP

(71) Applicant: Shock Therapy Suspension, Inc., Duluth, GA (US)

(72) Inventor: Justin Smith, Wittmann, AZ (US)

(73) Assignee: Shock Therapy Suspension, Inc., Duluth, GA (US)

(*) Notice: Subject to any disclaimer, the term of this patent is extended or adjusted under 35 U.S.C. 154(b) by 0 days.

(21) Appl. No.: 18/300,648

(22) Filed: Apr. 14, 2023

Related U.S. Application Data

(63) Continuation-in-part of application No. 29/848,890, filed on Aug. 5, 2022.

(60) Provisional application No. 63/478,784, filed on Jan. 6, 2023.

(51) Int. Cl.
  *A47C 27/08* (2006.01)
  *B60G 13/00* (2006.01)

(52) U.S. Cl.
  CPC ...... *B60G 13/005* (2013.01); *B60G 2204/129* (2013.01)

(58) Field of Classification Search
  CPC .................. B60G 13/005; B60G 2204/129

USPC ..................................................... 188/321.11
See application file for complete search history.

(56) References Cited

U.S. PATENT DOCUMENTS

| | | | | |
|---|---|---|---|---|
| 6,029,958 | A | * | 2/2000 | Larsson ................. F16F 9/342 267/113 |
| 2005/0109570 | A1 | * | 5/2005 | Muller ................. F16F 9/3242 188/321.11 |
| 2019/0390730 | A1 | * | 12/2019 | Russell ................. F16F 9/065 |
| 2022/0281278 | A1 | * | 9/2022 | Boulay ................. B60G 13/08 |

FOREIGN PATENT DOCUMENTS

FR    2675431 A1 * 10/1992 ........... B60G 13/006

* cited by examiner

*Primary Examiner* — Christopher P Schwartz
(74) *Attorney, Agent, or Firm* — Schmeiser, Olsen & Watts LLP

(57) ABSTRACT

A shock end loop for use with a shock absorber having a shaft is provided. A shock end loop according to various aspects of the present technology may include a body portion adapted for engagement with a threaded end of the shaft. The shock end loop may also include a neck portion coupled to the body portion and extending upward therefrom and adapted for engagement with the shaft for firmly securing and supporting the shaft to counteract a side load or bending torque that is exerted on the shaft by the vehicle.

15 Claims, 10 Drawing Sheets

SHOCK END LOOP

CROSS REFERENCE TO RELATED APPLICATION(S)

This application claims priority to U.S. Provisional Patent Application entitled "SHOCK END LOOP," Ser. No. 63/478,784, filed Jan. 6, 2023, and is a continuation-in-part of U.S. Design Patent Application entitled "SHOCK END LOOP," serial number 29/848,890, filed Aug. 5, 2022, the disclosures of which are hereby incorporated entirely herein by reference.

BACKGROUND OF THE TECHNOLOGY

Technical Field

The technical field relates to shock ends for use with shock absorbers or shock dampers. Particularly, the technical field relates to a shock end loop for use with a shaft of a shock damper or shock absorber.

State of the Art

In a vehicle, shock dampers or shock absorbers limit excessive movement of a vehicle's suspension by damping oscillations and vibrations, reducing the effect of traveling over rough ground. A shock absorber typically comprises a shaft and a spring and utilizes valving of oil and gasses to absorb excess energy from the spring.

Vehicles transfer forces to a shock absorber while the vehicle is in use. These forces can be increased due to, but not limited to, side-to-side load when a vehicle is navigating a curve or turn, the addition of bolt-on aftermarket suspension parts, coil spring bind, or excessive abuse of the vehicle's suspension system. When the transferred load exceeds a particular threshold force, the shaft or a portion of the shaft can break off the shock absorber, damaging the shock absorber. Because effective wheel bounce damping requires that the shock absorber be tuned to a particular optimal resistance, damage to the shock absorber affects the resistance of the shock absorber, thereby making the shock absorber ineffective.

Accordingly, what is a needed is an apparatus or device for a shock damper or shock absorber that is configured to withstand significant side loads or forces, leading to improved ride quality and vehicle handling.

SUMMARY OF THE TECHNOLOGY

The present technology relates to a shock end loop for use with a shock absorber having a shaft. A shock end loop according to various aspects of the present technology may comprise a body portion adapted for engagement with a threaded end of the shaft. The shock end loop may also comprise a neck portion coupled to the body portion and extending upward therefrom and adapted for engagement with the shaft for firmly securing and supporting the shaft to counteract a side load or bending torque that is exerted on the shaft by the vehicle.

The foregoing and other features and advantages of the present technology will be apparent from the following more detailed description of the particular embodiments of the technology, as illustrated in the accompanying drawings.

BRIEF DESCRIPTION OF THE DRAWINGS

A more complete understanding of the present technology may be derived by referring to the detailed description and claims when considered in connection with the Figures, wherein like reference numbers refer to similar items throughout the Figures, and:

DETAILED DESCRIPTION OF EMBODIMENTS

As discussed above, embodiments of the present technology relate to a shock end loop that is attachable to a shock absorber and that operates to firmly secure and support a shaft of the shock absorber in order to counteract a side load or bending torque that is exerted on the shaft by the mass of the vehicle in operation.

Figure 1:
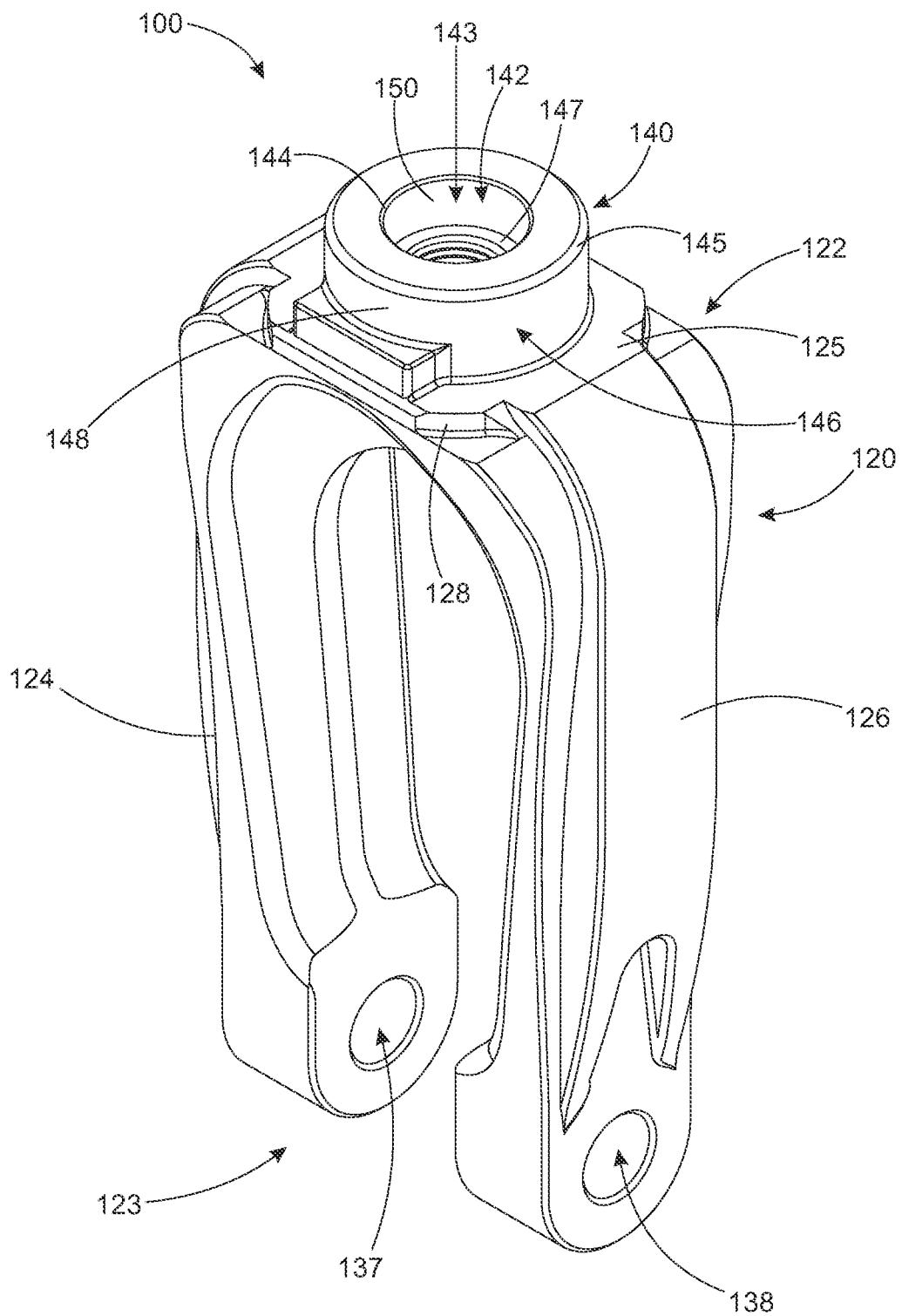
FIG. 1 is a perspective view of a shock end loop in accordance with an embodiment of the present technology.
Figure 2:
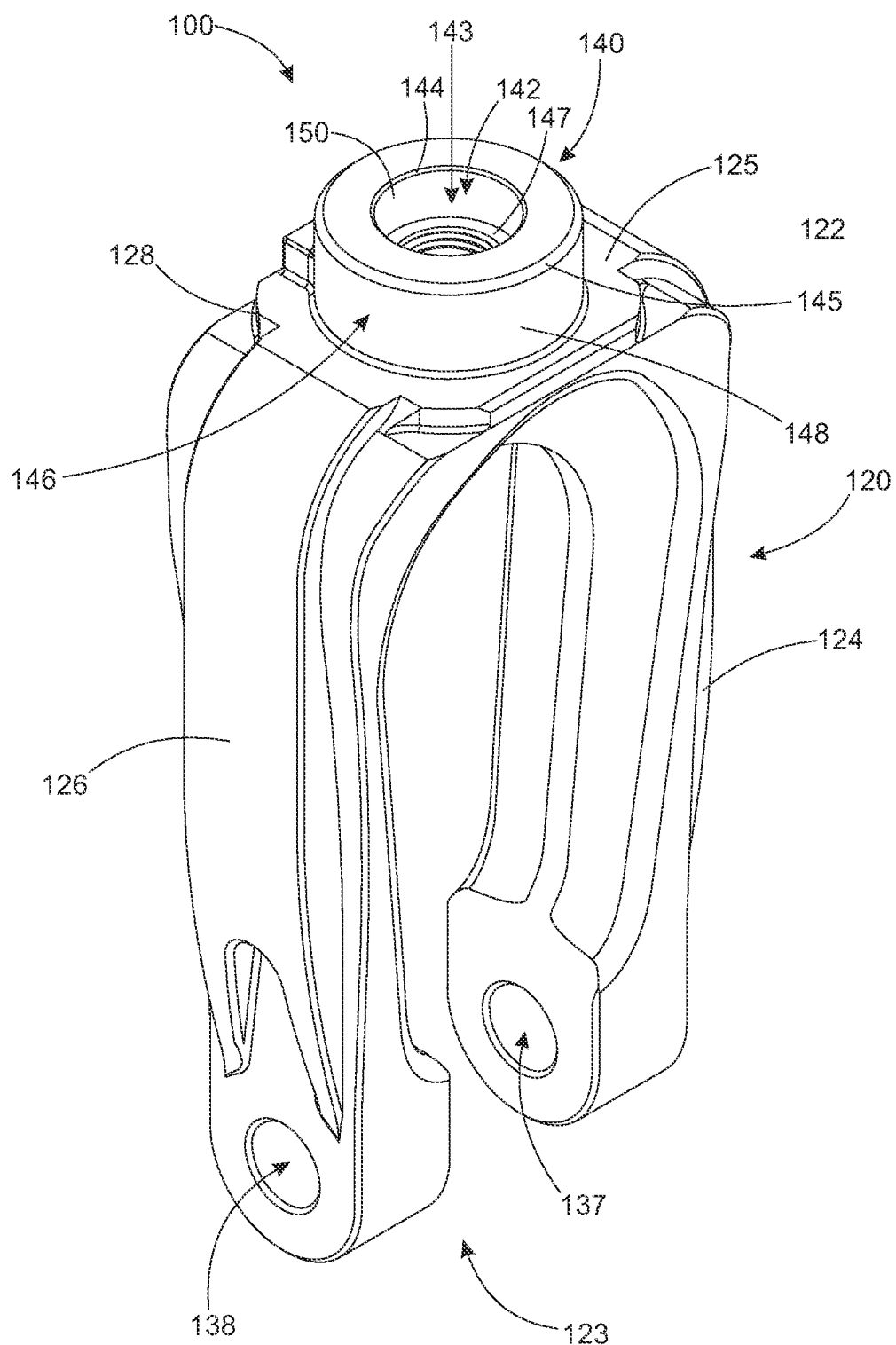
FIG. 2 is a perspective view of a shock end loop in accordance with an embodiment of the present technology.
Figure 3:
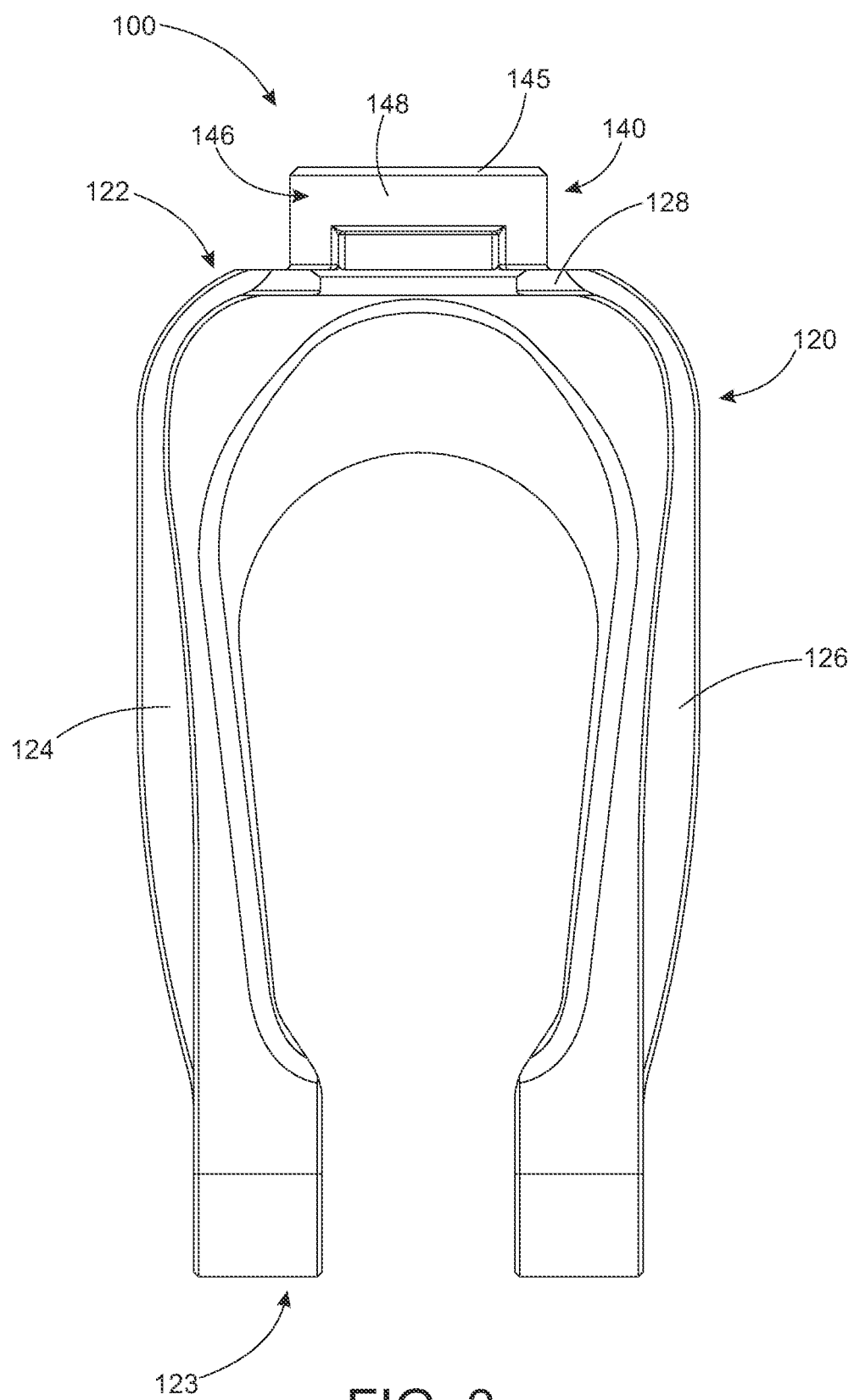
FIG. 3 is a front view of a shock end loop in accordance with an embodiment of the present technology.
Figure 4:
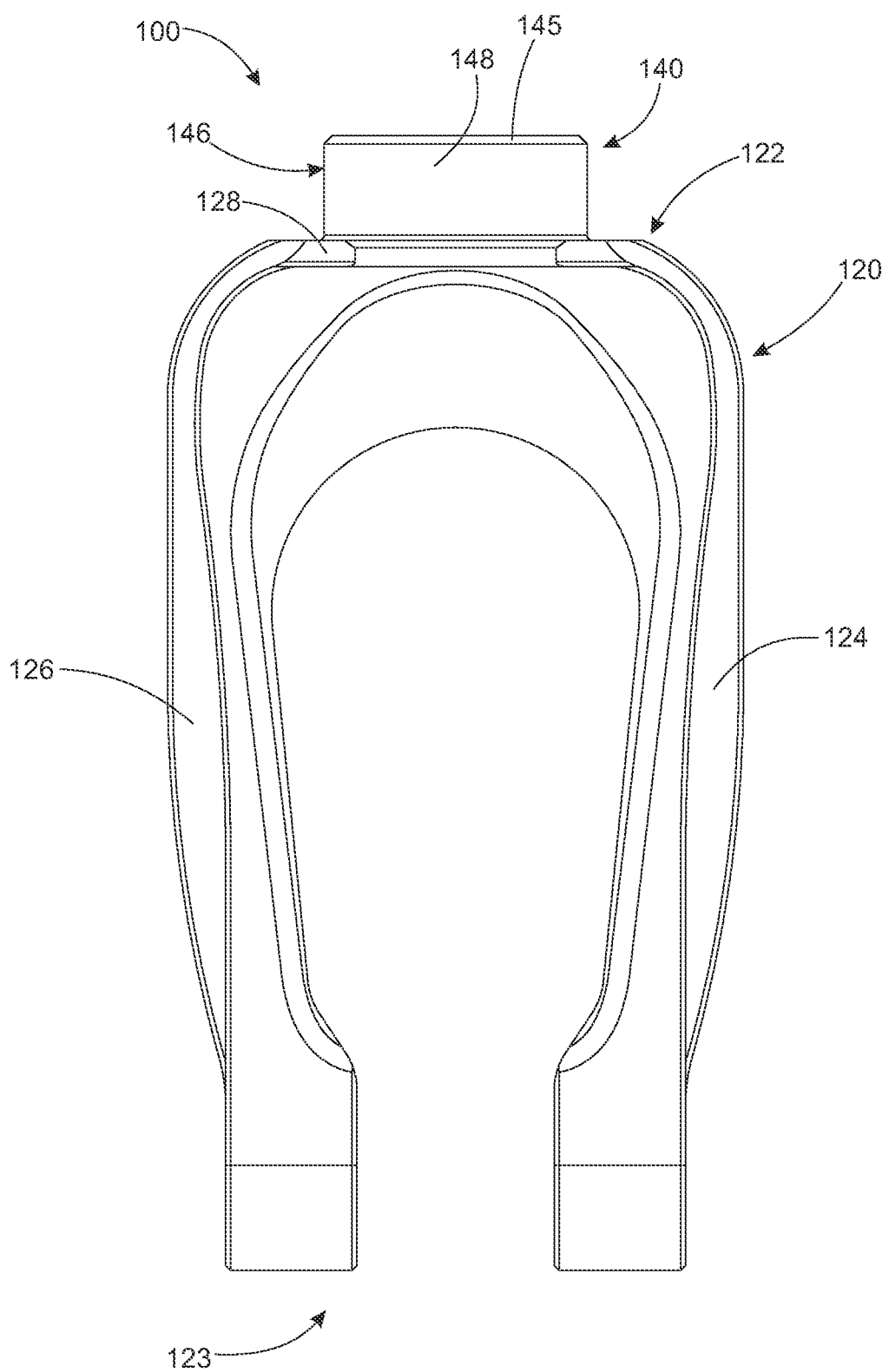
FIG. 4 is a rear view of a shock end loop in accordance with an embodiment of the present technology.
Figure 5:
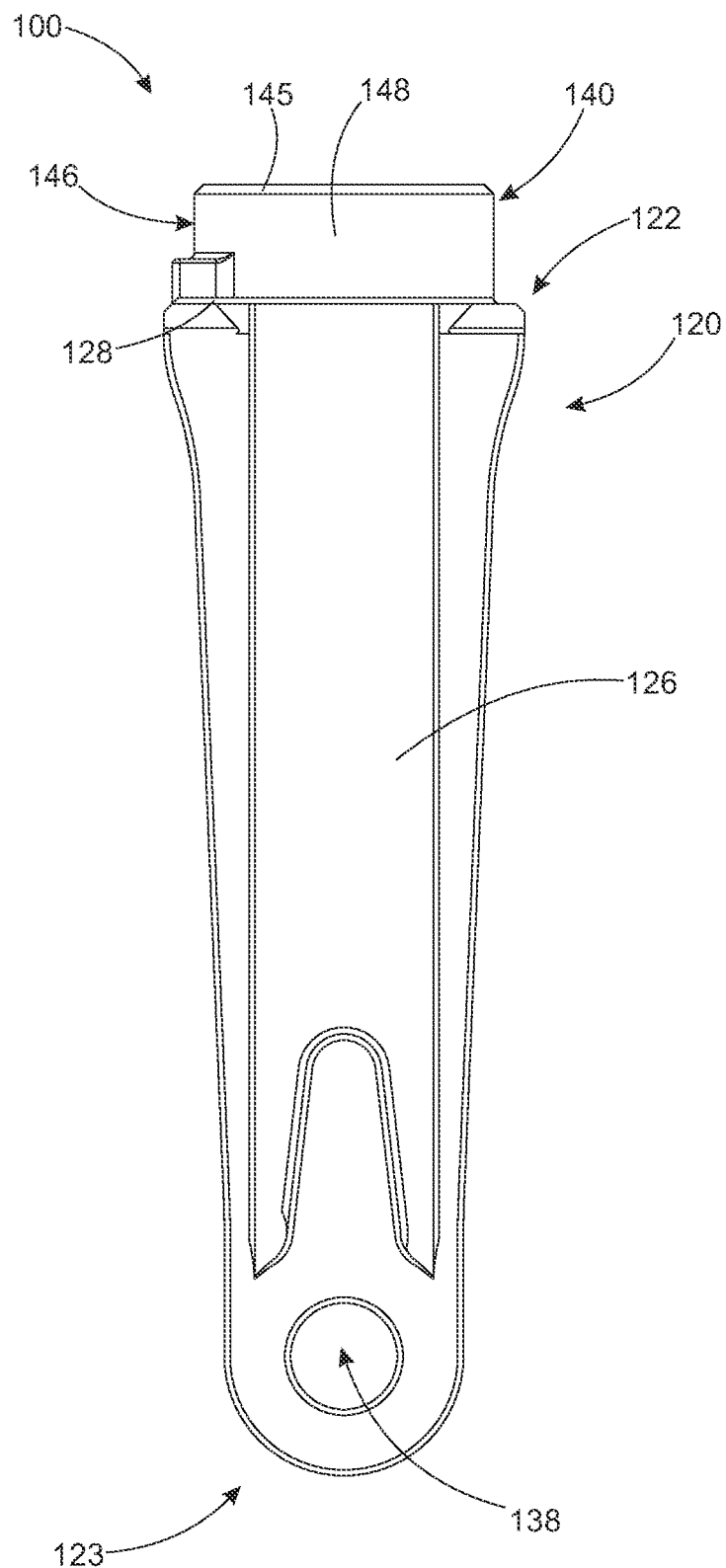
FIG. 5 is a side view of a shock end loop in accordance with an embodiment of the present technology.
Figure 6:
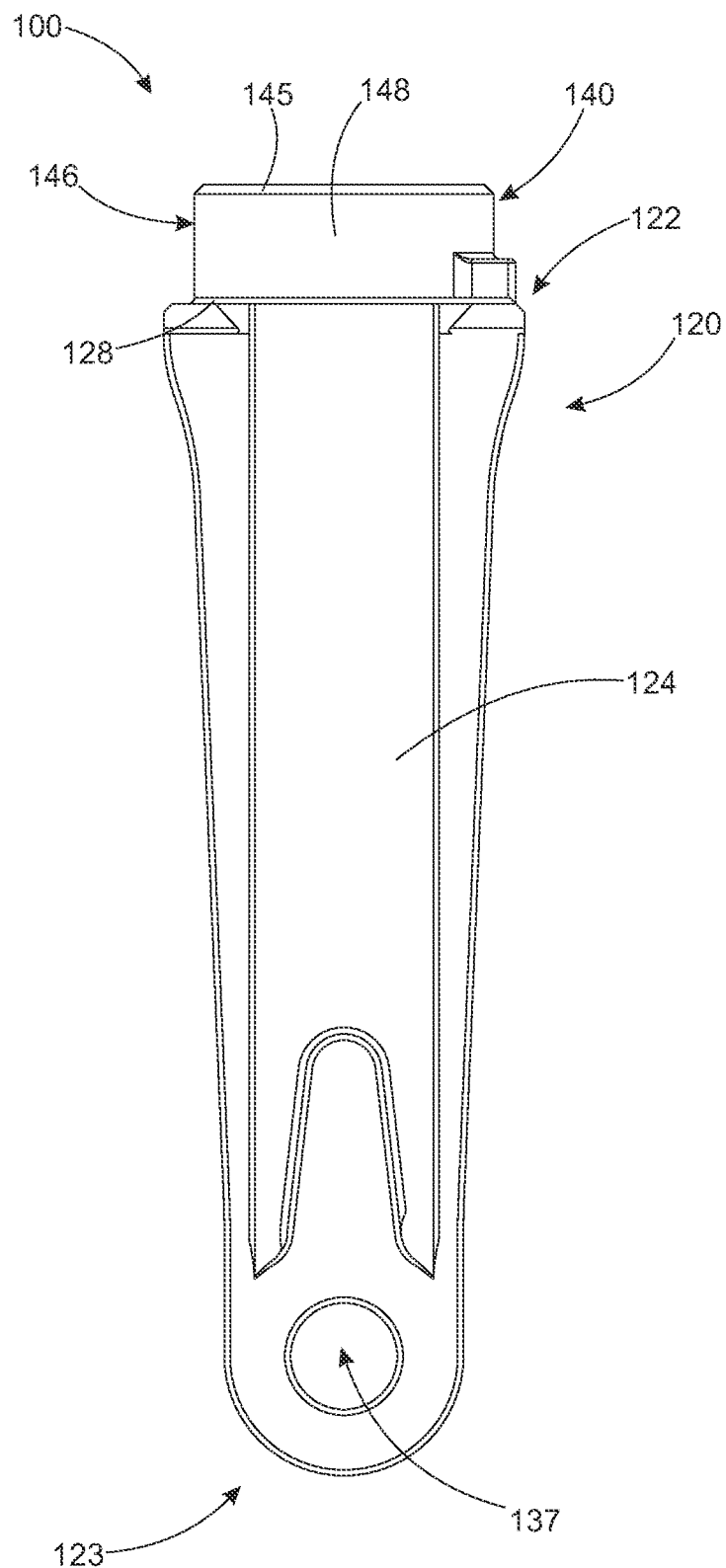
FIG. 6 is a side view of a shock end loop in accordance with an embodiment of the present technology.
Figure 7:
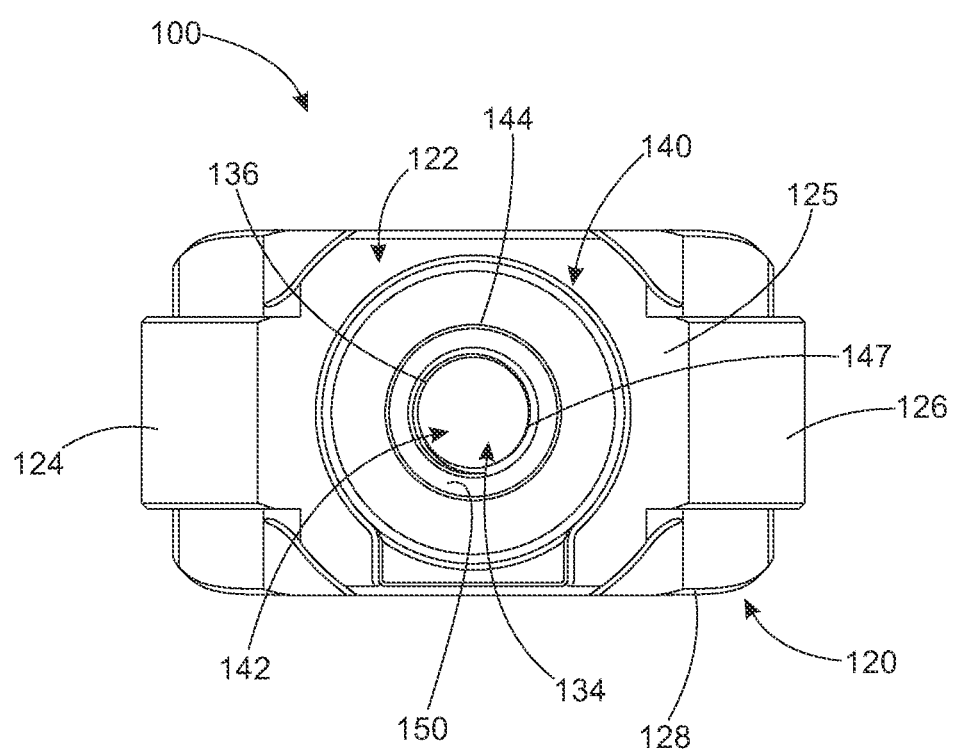
FIG. 7 is a top view of a shock end loop in accordance with an embodiment of the present technology.
Figure 8:
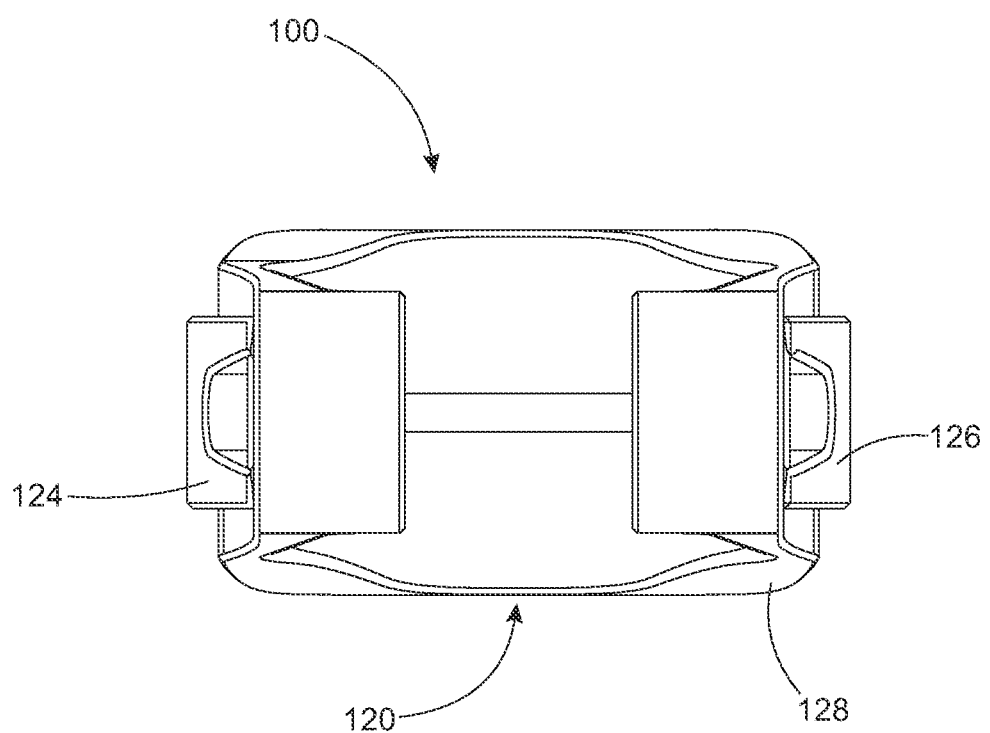
FIG. 8 is a bottom view of a shock end loop in accordance with an embodiment of the present technology.
Figure 9:
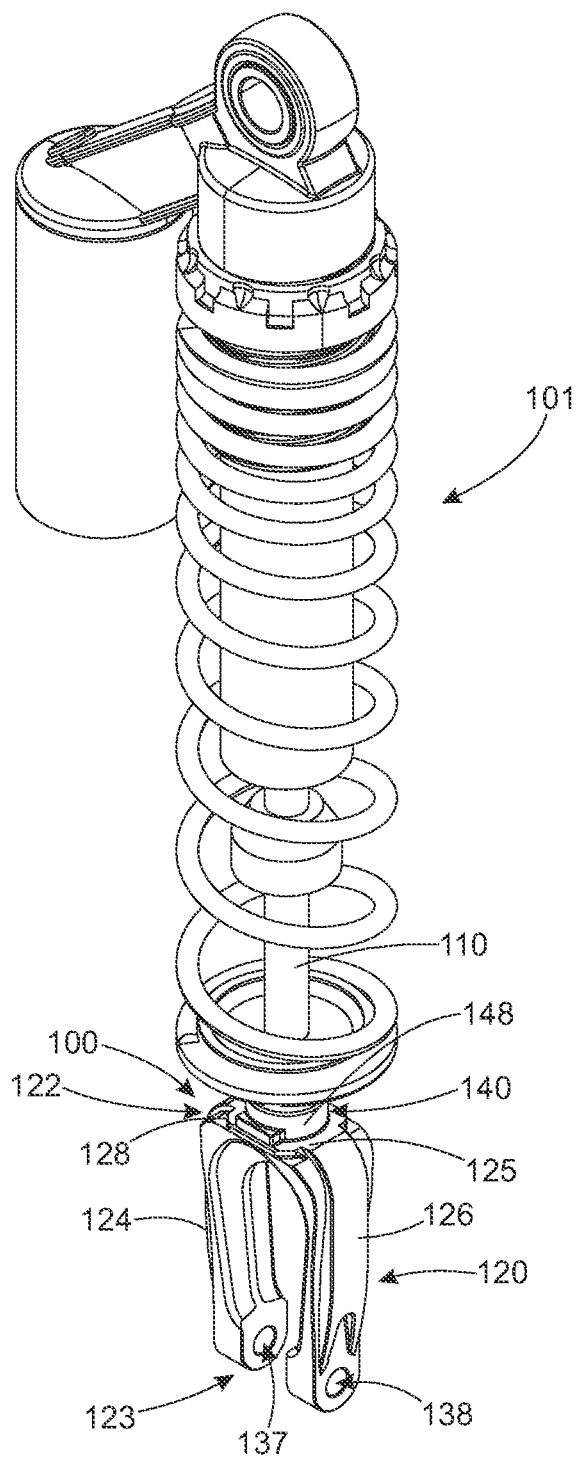
FIG. 9 is a perspective view of a shock absorber with a shock end loop according to an embodiment of the present technology.
Figure 10A:
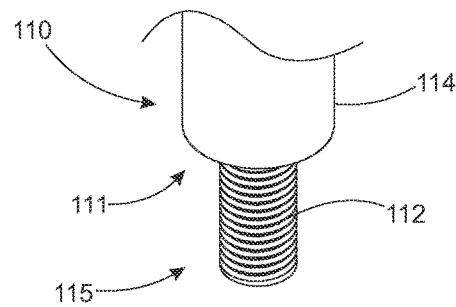
FIG. 10A is a front view of a shaft of a shock absorber in accordance with an embodiment of the present technology.
Figure 10B:
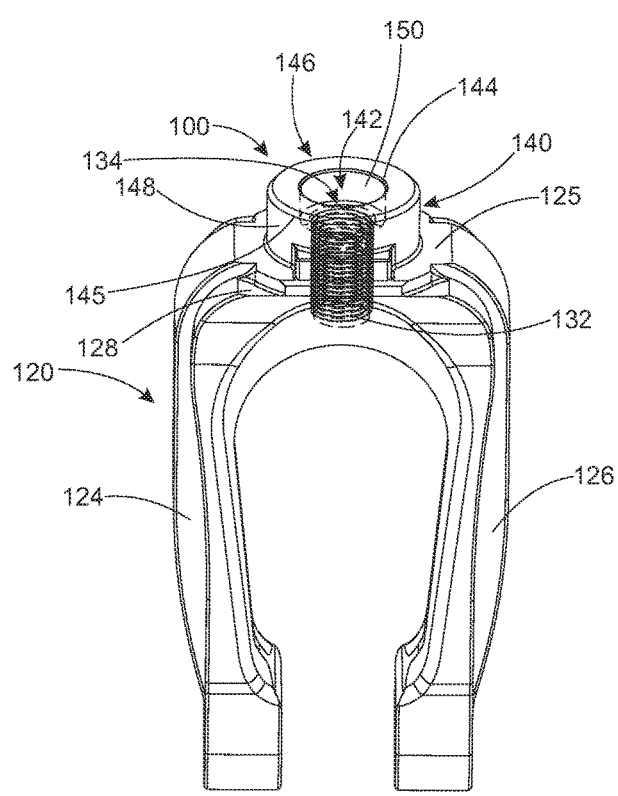
FIG. 10B is a front view of a shock end loop in accordance with an embodiment of the present technology.
Figure 10C:
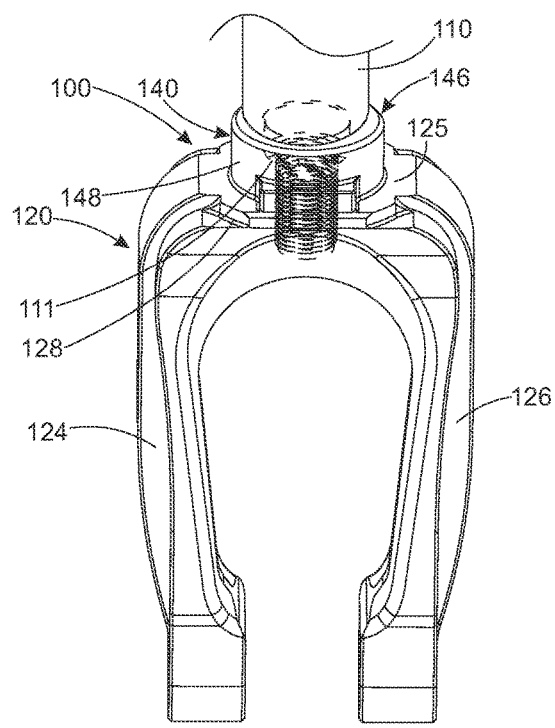
FIG. 10C is a front view of the shaft shown in FIG. 10A coupled to the shock end loop shown in FIG. 10B in accordance with an embodiment of the present technology.

Referring to FIGS. 1-10C, in various embodiments, a shock end loop 100 attachable to a shock damper or shock absorber 101, may comprise a body portion 120 attachable to a part of a vehicle, such as a suspension (not shown), and a neck portion 140 coupled to a first end 122 of the body portion 120 and adapted for engagement with a shaft 110 of the shock absorber 101. The shock end loop 100 may be detachably coupled to the shaft 110. The shock end loop 100 may be configured to firmly secure and support the shaft 110 in order to counteract a side load or bending torque that is exerted on the shaft 110 by the mass of the vehicle in operation.

The body portion 120 may comprise a u-shaped body having substantially parallel legs, such as a first leg 124 and a second leg 126, and a connecting bridge section 128 joining the first leg 124 and the second leg 126. The bridge section 128 may further comprise a locking assembly. In one embodiment, the locking assembly may be configured to couple the shaft 110 to the shock end loop 100 in a locked position, whereby the shaft 110 is twisted into the locked position by pressing the shaft 110 towards the neck 140 and turning the shaft 110 to lock into position. Similarly, the locking assembly may decouple the shaft 110 from the shock end loop 100 in an unlocked position, whereby the shaft 110 is twisted into the unlocked position by turning the shaft 110 to disengage.

As an example, and referring to FIGS. 7 and 10A-C, the bridge section 128 may comprise an inner surface 132 defining a receptacle cavity 134 formed in the bridge section 128 and internal threads 136 on the inner surface 132. The internal threads 136 may be in mating engagement with corresponding threads 112 formed at an end 115 of the shaft 110, so that the shaft 110 may be coupled to the shock end loop 100. The internal threads 136 on the inner surface 132 of the bridge section 128 may be formed spirally and circumferentially on the inner surface 132. The locking assembly may comprise any suitable device or system for locking the shaft 110 to the shock end loop 100 such that the threads 112 do not disengage or "break off" from the shaft 110 when a side load is applied to shock absorber 101 or shaft 110.

The body portion 120 may comprise one or more openings for receiving a coupling component (not shown) therethrough. For example, the first leg 124 may comprise a first opening 137 and the second leg 126 may comprise a second opening 138 at a second end 123 opposite the first end 122. The first opening 137 and the second opening 138 may be oriented transversely, so that the first opening 137 may be aligned with the second opening 138. Accordingly, a bolt (not shown) or other suitable coupling component may be inserted through the first opening 137 and the second opening 138 to secure the shock end loop 100 to a part of a vehicle suspension, or "steering knuckle," or other another part of the vehicle such as the forks.

The neck portion 140 may be coupled to a top surface 125 of the body portion 120 and extend upward therefrom. The neck portion 140 may comprise an open end 142 opposite the top surface 125 terminating in an inner annular edge 144 and a peripheral annular edge 145 and a sidewall 146 extending from the top surface 125 to the inner annular edge 144 and the peripheral annular edge 145. The sidewall 146 may comprise an outer surface 148 and an inner surface 150 defining a neck channel 143 in the neck portion 140. The inner surface 150 may be configured to receivably engage the shaft 110. The diameter of the neck channel 143 formed by the inner surface 150 may be substantially equal to the diameter of a circular outer edge 114 of the shaft 110, so that the circular outer edge 114 may be flush with the inner surface 150 of the neck portion 140 when receivably engaged with the sidewall 146 of the neck portion 140.

The sidewall 146 may also comprise an inwardly projecting internal lip 147, wherein a bottom end 111 of the shaft 110 may be configured to be positioned against the inwardly projecting internal lip 147. The inwardly projecting lip 147 may be positioned between the neck channel 143 and the receptacle cavity 134. The neck channel 143 may be aligned with the receptacle cavity 134.

The embodiments and examples set forth herein were presented in order to best explain the present technology and its practical application and to thereby enable those of ordinary skill in the art to make and use the technology. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A shock end loop attachable to a shaft of a shock absorber, comprising:
   a body portion adapted for engagement with a threaded end of the shaft; and
   a neck portion coupled to the body portion and extending upward therefrom, the neck portion comprising:
   an open end opposite the body portion terminating in a peripheral annular edge; and
   a sidewall comprising:
   an inner surface extending from the body portion to the peripheral annular edge, wherein the inner surface defines a neck channel; and
   an inwardly projecting internal lip, wherein a bottom end of the shaft is configured to be positioned against the inwardly projecting internal lip,
   wherein the neck portion is adapted for engagement with the shaft for firmly securing and supporting the shaft to counteract a side load or bending torque that is exerted on the shaft by the vehicle.

2. The shock end loop of claim 1, wherein the body portion comprises a u-shaped body.

3. The shock end loop of claim 2, wherein the u-shaped body comprises:
   substantially parallel legs comprising a pair of openings, wherein the openings are oriented transversely to each other; and
   a bridge section joining the legs.

4. The shock end loop of claim 3, wherein the substantially parallel legs are connected to a portion of a vehicle suspension.

5. The shock end loop of claim 3, wherein the bridge section comprises a receptacle cavity in the body portion for receiving the threaded end of the shaft.

6. The shock end loop of claim 5, wherein the receptacle cavity comprises a locking component configured to constrain a movement of the shaft with respect to the body portion.

7. The shock end loop of claim 6, wherein the locking component is further configured to disengage the shaft from the body portion.

8. The shock end loop of claim 5, wherein the inwardly projecting lip is positioned between the neck channel and the receptacle cavity.

9. The shock end loop of claim 5, wherein the neck channel is aligned with the receptacle cavity.

10. The shock end loop of claim 3, wherein:
    a diameter of the neck channel is substantially equal to a diameter of a circular outer edge of the shaft; and
    the circular outer edge is flush with the inner surface of the neck portion when receivably engaged with the sidewall of the neck portion.

11. A method for attaching a shock end loop to a shaft of a shock absorber, the shock end loop having a body portion adapted for engagement with a threaded end of the shaft and a neck portion coupled to the body portion and having an inner surface for receivably engaging the shaft, wherein the method comprises:
    aligning the neck portion of the shock end loop with the shaft;
    inserting the shaft through a neck channel of the neck portion until the threaded end of the shaft is engaged with the body portion, the neck channel comprising:
    an open end opposite the body portion terminating in a peripheral annular edge; and
    a sidewall comprising:
    an inner surface extending from the body portion to the peripheral annular edge, wherein the inner surface defines a neck channel; and
    an inwardly projecting internal lip, wherein a bottom end of the shaft is configured to be positioned against the inwardly projecting internal lip;
    securing the threaded end of the shaft to the body portion of the shock end loop; and using the shock end loop to counteract a side load or bending torque that is exerted on the shaft by a vehicle in response to the neck channel of the neck portion engaging with the shaft to firmly secure and support the shaft.

12. The method of claim 11, wherein securing the threaded end of the shaft to the body portion of the shock end loop comprises twisting the threaded end of the shaft into corresponding threads formed on an inner surface of a receptacle cavity formed in the body portion.

13. The method of claim 12, further comprising, prior to securing the threaded end of the shaft to the body portion of the shock end loop, positioning a bottom surface of the shaft against an inwardly projecting lip formed between the neck channel and the receptacle cavity.

14. The method of claim 13, wherein the neck channel is aligned with the receptacle cavity.

15. The method of claim 11, wherein inserting the shaft through the neck channel of the shock end loop comprises:
  receiving a circular outer edge of the shaft in the neck channel of the shock end loop; and
  ensuring that the circular outer edge of the shaft is flush with the inner surface of the neck portion when receivably engaged therewith.

* * * * *